United States Patent
Navarro et al.

(10) Patent No.: US 6,966,164 B2
(45) Date of Patent: Nov. 22, 2005

(54) TUBULAR BANDING APPLICATOR AND METHOD

(75) Inventors: Jaime Navarro, Sanford, NC (US); Kuo-Raid Grant Chen, Cary, NC (US); Adam Whitaker Duncan, Clayton, NC (US)

(73) Assignee: Axon Corporation, Raleigh, NC (US)

( * ) Notice: Subject to any disclaimer, the term of this patent is extended or adjusted under 35 U.S.C. 154(b) by 81 days.

(21) Appl. No.: 10/789,216

(22) Filed: Feb. 27, 2004

(65) Prior Publication Data

US 2005/0072510 A1 Apr. 7, 2005

Related U.S. Application Data

(63) Continuation-in-part of application No. 10/677,204, filed on Oct. 2, 2003, now abandoned.

(51) Int. Cl.[7] .................................................. B65B 9/13
(52) U.S. Cl. ........................... 53/399; 53/585; 53/292; 53/298; 156/86; 156/556
(58) Field of Search ............................ 53/290, 291, 292, 53/297, 298, 399, 585; 156/86, 540, 556, 566

(56) References Cited

U.S. PATENT DOCUMENTS

| | | | | |
|---|---|---|---|---|
| 3,841,940 A | * | 10/1974 | Rubinich | 156/86 |
| 3,861,118 A | * | 1/1975 | Muto | 53/292 |
| 3,888,067 A | * | 6/1975 | Cross et al. | 53/292 |
| 3,974,628 A | * | 8/1976 | Konstantin | 53/291 |
| 4,102,728 A | * | 7/1978 | Smith | 53/585 |
| 4,208,857 A | * | 6/1980 | Fujio | 53/585 |
| 4,388,797 A | * | 6/1983 | Shields | 53/585 |
| 4,765,121 A | * | 8/1988 | Konstantin et al. | 53/585 |
| 4,806,187 A | * | 2/1989 | Fujisawa | 53/585 |
| 5,024,049 A | * | 6/1991 | Strub et al. | 53/585 |
| 5,466,210 A | * | 11/1995 | Wilcox | 53/291 |
| 5,737,900 A | * | 4/1998 | Konstantin et al. | 53/295 |
| 6,684,599 B1 | * | 2/2004 | Fresnel | 53/64 |

* cited by examiner

Primary Examiner—John Sipos
(74) Attorney, Agent, or Firm—Michael R. Philips

(57) ABSTRACT

The tubular banding applicator converts a flat tubular material into a cut length expanded tubular sleeve and mounts the sleeve circumferentially on a container. A driver moves a selected length of flat tubular material from a supply station, around a spreader, and into a hollow former having a retaining gate at an exit thereof. A cutter severs the selected length of tubular material from the supply station and a flow of air directed at a side of the flat tubular length assists in opening the sleeve. A conveyor carries a series of containers along a path to position each container in turn in alignment with the opened tubular sleeve. The driver moves a second selected length of flat tubular material from the supply into the former, thereby ejecting the first open sleeve from the former onto a container aligned below. The sleeve is subsequently caused to shrink to securely enwrap the container. The cut length may be either short in comparison to the height of the container and applied as a band between the container neck and a closure, or longer and applied to cover all or a portion of the container body.

21 Claims, 6 Drawing Sheets

| | |
|---|---|
| 102 | START |
| 104 | INITIATE AIR FLOW |
| 106 | ACTIVATE CONTAINER CONVEYOR |
| 108 | CROSS FOLD TUBULAR FILM |
| 110 | EXTEND FIRST LENGTH OF TUBULAR FILM |
| 112 | INSERT TUBULAR FILM INTO FORMER |
| 114 | AWAIT STOP SIGNAL |
| 116 | IS REGISTRATION MARK DETECTED? |
| 118 | [ YES -> GO TO STEP 120<br>[<br>[ NO -> WAIT FOR SET LENGTH SIGNAL,<br>[ THEN GO TO STEP 120 |
| 120 | STOP EXTENSION OF TUBULAR FILM; TUBULAR FILM IN FORMER |
| 121 | EXTEND GATE |
| 122 | CUT TUBULAR FILM ABOVE FORMER |
| 124 | CUT TUBULAR FILM OPENS |
| 125 | DETECT APPROACH OF CONTAINER |
| 126 | RETRACT GATE |
| 128 | EXTEND NEXT TUBULAR FILM LENGTH INTO FORMER, PUSHING FIRST TUBULAR FILM LENGTH OUT OF FORMER AND ONTO CONTAINER |
| 130 | GO TO STEP 114 |

Fig. 8

TUBULAR BANDING APPLICATOR AND METHOD

RELATED APPLICATION

This application is a continuation-in-part of application Ser. No. 10/677,204 filed Oct. 2, 2003, now abandoned.

FIELD OF THE INVENTION

The present invention relates to the field of equipment and methods for applying tubular labels to containers, and more particularly to such labels that are supplied in flattened condition, opened prior to placement on a container and heat shrunk subsequent to being placed on the container.

BACKGROUND OF THE INVENTION

Traditionally, labels were attached by adhesive means to portions of the outer surface of containers to identify the enclosed products. This concept was particularly valid in the case of glass or plastic containers that could be more easily labeled than printed. More recently, labels have been used as surface ornamentation for most or all of the surface of the container, in addition to providing the necessary identification and information. Such full surface labels are often provided as a tube that is placed over the container and subsequently caused to shrink to snugly fit the container's contour. The tube is either made by tubular extrusion or by welding opposed longitudinal edges of an elongate sheet. The same advantage as noted above is obtained by printing the tubular label, rather than printing directly on the container, to decorate the container and identify the contents. Numerous products are being marketed today in containers with tubular labels.

Some containers are sealed by the application of a tubular band that covers all or a portion of the container neck and closure. Bands are generally shorter than labels. Bands serve as a tamper-evident indicator, thus improving product safety.

Tubular labels or bands can be supplied in cut lengths and fed from a magazine to the application machine, or supplied in continuous length on a roll, in which case the tubular supply is cut into pieces of a desired length in the applying machine. Tubular labels and bands are typically formed of polyvinyl chloride (PVC) or polyethylene (PE) resin. The process of applying a tubular label or band from a supply roll to a container involves the steps of drawing a length of tubular material from the supply, cutting the length of tubular material from the supply, reconfiguring the tubular material from a flat to an open cross section and placing the open cross section tubular material over the container in the selected position. The material may be substantially elastic and stretched to fit over the container, allowing the material to recover and to grip the container. Alternately, the material may be heat shrinkable, in which case the tube is placed loosely over the container and subsequently shrunk. The present invention is mainly directed to the application of labels and bands made of heat shrinkable material.

A machine for applying tubular labels to containers is disclosed in U.S. Pat. Nos. 5,305,578, No. 5,495,704 and No. 5,711,135 to Menayan. The Menayan apparatus utilizes a series of movably mounted suction cups for gripping successive cut bands. The suction cups are moved laterally to open the band from its flattened supply condition to an open application condition. A plunger is mounted angularly above the open band and activated to drive the leading band edge onto a leading edge of a container passing therebelow at the same time as an air blast is used to maintain the band in an open condition.

A further machine for performing such a handling process for a tubular band is the subject of U.S. Pat. No. 4,914,893 to Strub et al., entitled Large Size Container Banding Apparatus. The Strub et al. invention draws a length of tubular banding material from a supply roll of flat tube and expands the banding material to a substantially round cross section by pulling the banding material over an inserted wedge device which has rollers for smoothing edge creases that were formed in the previously flat tube. As the tubular band is cut to a desired length, a suction cup suspension means attaches to the band to maintain control during application of the band to the container closure. The band is subsequently heat shrunk to snugly surround the container closure and neck.

The present invention disclosed and claimed below provides a novel improvement over all known prior patents for the high speed expansion and mounting of short bands or full cover tubular labels to containers.

The present invention to be described below enables a large variety of band sizes to be applied to containers at a rapid rate and with relatively few moving machine parts. In this way, the present invention affords a simple, efficient band or label application apparatus and method.

SUMMARY OF THE INVENTION

The high speed banding applicator of the present invention provides a means to convert a flattened tubular supply material into a cut length expanded tubular band or label and to mount the cut length circumferentially onto a container. A drive station operates to advance a first selected length of flat tubular material from a supply station, around a spreader, and into a hollow cylindrical former. A gate is extended to temporarily prevent the tube from passing through the former. A cutter is activated to sever the selected length of opened tubular material from the supply to form a sleeve, and an air flow is directed at opposed sides of the cut sleeve to cause it to open radially. A conveyor transports a series of containers from a supply to a position in alignment with the axis of the former. The gate is retracted to allow the cut sleeve to pass out of the former. A second selected length of flat tubular material is advanced from the supply into the hollow former, thereby pushing the opened cut sleeve out of the former and onto the container aligned therewith. The sleeve is caused to shrink in a subsequent process so as to securely wrap around the container. The cut sleeve may be either a minor fraction of the height of the container and applied as a tamper-evident band over the container neck and closure, or a major fraction of the height of the container as a label.

BRIEF DESCRIPTION OF THE DRAWINGS

The present invention is best understood in conjunction with the accompanying drawing figures in which like elements are identified by similar reference numerals and wherein:

FIG. 8 is a flow chart showing the steps involved in the present invention banding applicator process.

DETAILED DESCRIPTION OF THE PREFERRED EMBODIMENT

Figure 1:
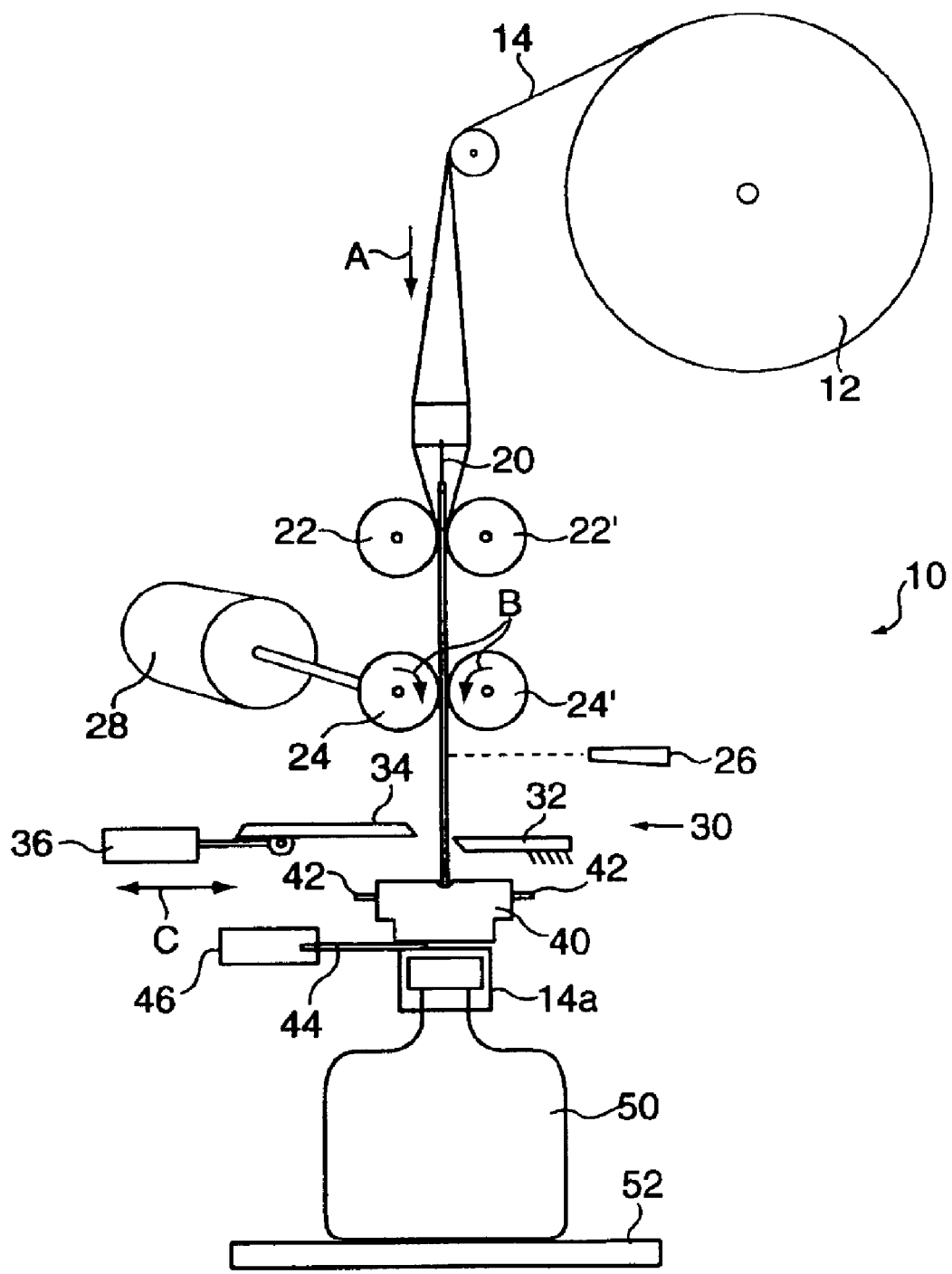
FIG. 1 is a schematic front elevation view of the tubular banding applicator of the invention.

The banding applicator apparatus 10 of the present invention is schematically illustrated in FIG. 1, comprising a machine for radially opening flattened tubular material to an expanded condition and placing a cut length of the opened tubular material circumferentially onto a container. The term "radially opening" indicates that the tube is expanded outwardly from a central axis of its flattened configuration to become two-dimensional in cross section, although not necessarily round; i.e. the opened tube may be shaped to match the cross section of the container on which the opened tube is to be mounted. As noted above, the present invention pertains to the mounting of a short band on the neck and closure portion of a container as well as to mounting a longer label to cover and decorate a major portion of the container's surface.

Referring now to FIG. 1, a quantity of flattened tubular banding material 14 is provided, preferably from a supply roll 12 that is rotatably mounted to enable tubular material 14 to be drawn through banding applicator 10 as needed. Tubular material 14 is drawn in the direction indicated by arrow A, passing over a spreader 20, between a pair of idler rollers 22, 22', and between a pair of drive rollers 24, 24'. Spreader 20, to be described below, is placed inside tubular material 14 and supported on idler rollers 22, 22' that are spaced from each other a distance sufficient to allow flattened tubular material 14 to pass therebetween and to maintain spreader 20 substantially in the position illustrated. Drive rollers 24, 24' are intermittently driven in the direction indicated by arrows B by driver 28, for example a stepper motor, as is known in the trade. In practice, only drive roller 24 is driven by driver 28, and gearing between their respective shafts drives roller 24'. Alternatively, driver 28 may be another form of device, such as a motor and clutch combination, a linear motor, or a fluid-actuated cylinder. According to the preferred embodiment of the invention, driver 28 is actuated to extend a portion of tubular material 14 from supply 12, and driver 28 is deactivated when a selected operator-preset length of tubular material 14 has been extended. The preset length may be determined by monitoring rotations of idler rollers 22, 22' or by an encoder connected to driver 28. In another embodiment, a sensor 26, for example an optical detector, is connected to be in communication with driver 28 and to cause driver 28 to stop in response to detecting a registration mark printed on tubular material 14. The tubular film for use in this second embodiment is printed with a series of such registration marks that are spaced apart from one another a distance equal to the desired length of the band to be cut.

Tubular material 14 next passes a cutter 30, which in the preferred embodiments comprises a fixed blade 32, a moving blade 34, and a blade actuator 36, as shown. Moving blade 34 is driven into and out of engagement with fixed blade 32 in the direction indicated by arrow C. Actuator 36 is, for example, a pneumatically actuated cylinder. Other types of cutter 30 may be utilized, as is applicable to the banding material employed. A forward portion of tubular material 14 is inserted into former 40 that is mounted below cutter 30.

A gate 44 is mounted horizontally at a level adjacent to the lower surface of former 40 so as to be horizontally moveable. Gate 44 is extended and retracted by actuator 46, which may be a fluid-operated cylinder or other form of linear motion driver. Alternatively, gate 44 may be configured to rotate in a horizontal plane to be placed into and out of the path of tubular material 14 by a controllable rotary device such as a servo motor.

Tubular material 14 is inserted into former 40, and after being cut at a selected length, cut sleeve 14a opens radially for mounting onto a container 50 as container 50 is moved into position by conveyor 52. Former 40 is described in detail below. When container 50 is in axial alignment below former 40, gate 44 is retracted by actuator 46. Opened sleeve 14a is expelled from former 40 by the advancement of a second length of tubular material 14 and mounted onto container 50 as container 50 is being moved below former 40 by container conveyor 52. According to the preferred embodiment, conveyor 52 moves a series of containers 50 continuously without stopping as an expanded sleeve 14a is expelled from former 40 and placed on each container 50 in sequence. Conveyor 52 travels in a direction perpendicular to arrow A. Although the illustration of FIG. 1 shows a sleeve 14a that is relatively short in length as is used to indicate to the consumer that container 50 has not previously been opened, and container 50 is of an arbitrary shape, decorative full length sleeve labels and different shaped containers 50 are understood to be in the scope of the present invention.

Figure 2:
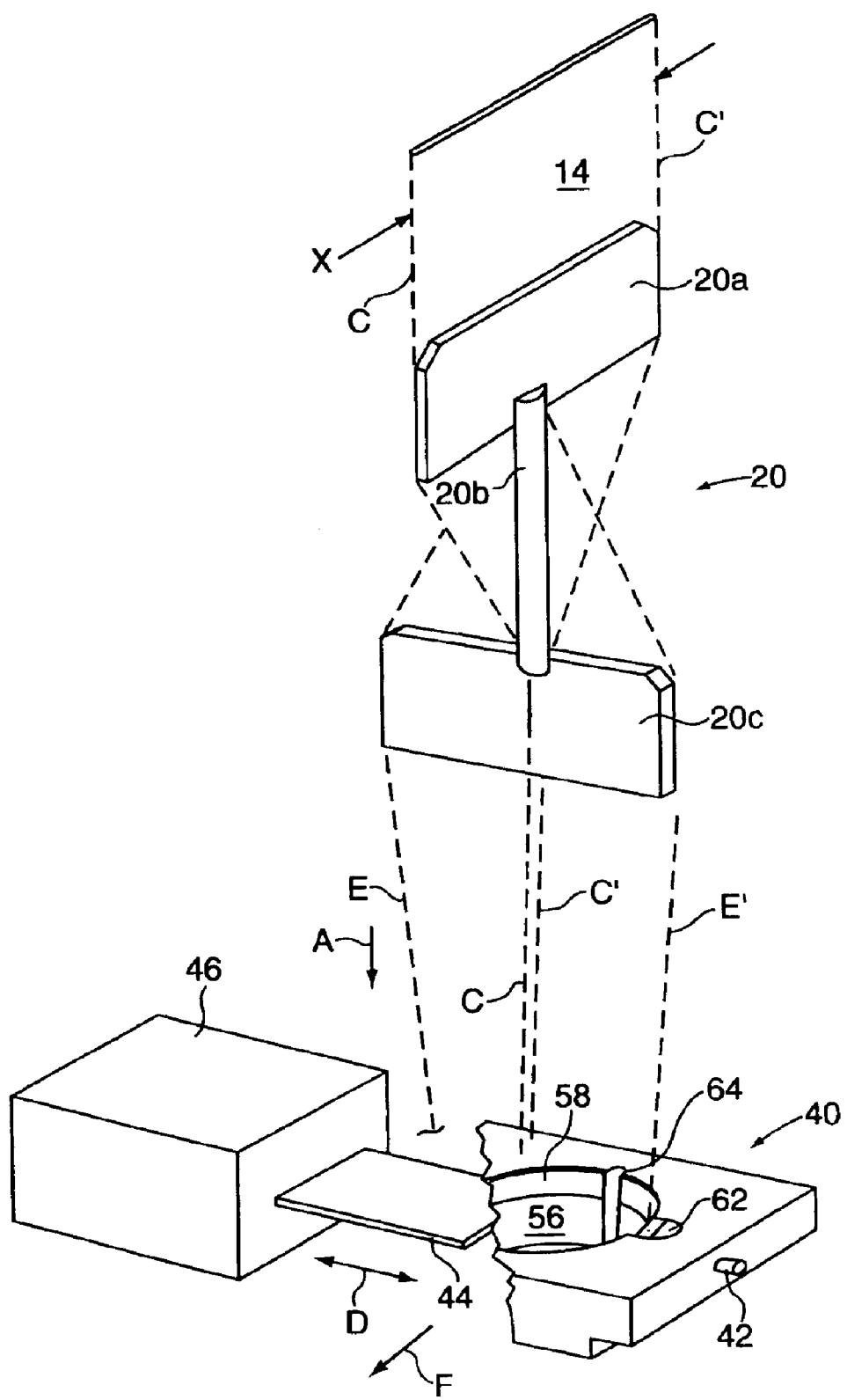
FIG. 2 is a perspective view illustrating the transition of tubular material in a flaftened condition passing over a spreader and into a former, with the former partially cut away to expose a retractable plate adjacent thereto.

Referring now to FIG. 2, the flow of tubular material 14 passing around internal spreader 20 and into former 40 is illustrated in greater detail, with certain other machine components deleted for purposes of clarity. As it is coiled on and drawn from supply roll 12 (FIG. 1), flat tubular material 14 has a "layflat" dimension X. Dimension X is the width of flattened tubing, represented by the formula X=Πr, where "r" is the radius of the opened tube in circular cross section. Because tubular material 14 is coiled and stored under winding tension in the form of supply roll 12, tubular material 14 forms and tends to retain a pair of creases C and C' on opposite edges thereof. In FIG. 2, creases C, C' are illustrated as lines composed of a long dash followed by two short dashes. Spreader 20 comprises an example of means for cross folding that is placed within tubular material 14 so that creases C, C' that were located at opposed edges of tubular material 14 lie adjacent to one another; other cross folding means are usable. After passing over spreader 20, creases C, C' are repositioned to the center of tubular material 14 and pulled open. Spreader 20 has an upper plate 20a and a lower plate 20c that are connected to one another in spaced relation by a bar 20b. Upper plate 20a and lower plate 20c each reside in vertical planes that are mutually perpendicular. Upper plate 20a and lower plate 20c are substantially equal in width. Spreader 20 is placed within the interior of tubular banding material 14 so that creases C, C' slidingly engage the vertical lateral edges of upper plate 20a. As tubular material 14 is drawn over spreader 20 and passes lower plate 20c, it is seen that lower plate 20c spreads tubular band 14 in a direction perpendicular to a plane between crease C and crease C', thus causing the flat aspect of tubular material 14 to be reversed. During the step of spreading tubular material 14 transverse to creases C, C', creases C, C' remain oriented in a plane defined by the vertical edges of upper plate 20a, thereby passing creases C, C' close to the center of lower plate 20c. By making the width of lower plate 20c also similar to "layflat" width X of flat tubular material 14, creases C, C' are pulled fully open across lower plate 20c, although creases C, C' are not flattened or eradicated. The opposed vertical edges of lower plate 20C create a pair of conforming edges E, E' in tubular material 14. Edges E, E' are not typically creases in that they are not retained when tubular material 14 is released. Edges E, E' are represented by uniform length dash lines. Although not shown in FIG. 2 for reasons of clarity, idler rollers 22, 22' and driven rollers 24, 24' reside between spreader 20 and former 40 (see FIG. 1), with idler rollers 22, 22' supporting spreader 20. Tubular material 14 next passes into former 40, shown in detail in FIGS. 3, 4 and 5 and described below. Former 40 is mounted so that a pair of channels 62 are aligned parallel to lower plate 20c and a pair of guide grooves 64 are aligned parallel to upper plate 20a. As opened tubular material 14 passes into former 40, creases C, C' are maintained in alignment with guide grooves 64, which serve to prevent tubular material 14 from twisting.

As tubular material 14 passes into former 40, edges E, E' enter respective channels 62 and creases C, C' are adjacent to one another. Gate 44 is in its extended position below former 40 to prevent cut sleeve 14a from dropping. A supply of air is connected to an inlet 42 on either side of former 40, each inlet 42 having a discharge end in a respective channel 62. As cutter 30 (FIG. 1) severs the extended portion of tubular material 14 at a level slightly above former 40, the air flow through inlets 42 urges the cut sleeve to assume a cylindrical configuration in substantially cross-sectional conformity with the internal shape of cylindrical portion 56. When a container 50 is about to be aligned below the opening in former 40, gate 44 is retracted in the direction shown by arrow D and a further length of tubular material 14 is extended to discharge the cut sleeve 14a onto container 50. While the preferred embodiment of the invention described relates to a former and container that are substantially round in cross section, other cylindrical cross sections, such as square or rectangular, are contemplated as would comport to the cross section of the container onto which tubular material 14 is to be mounted.

Figure 3:
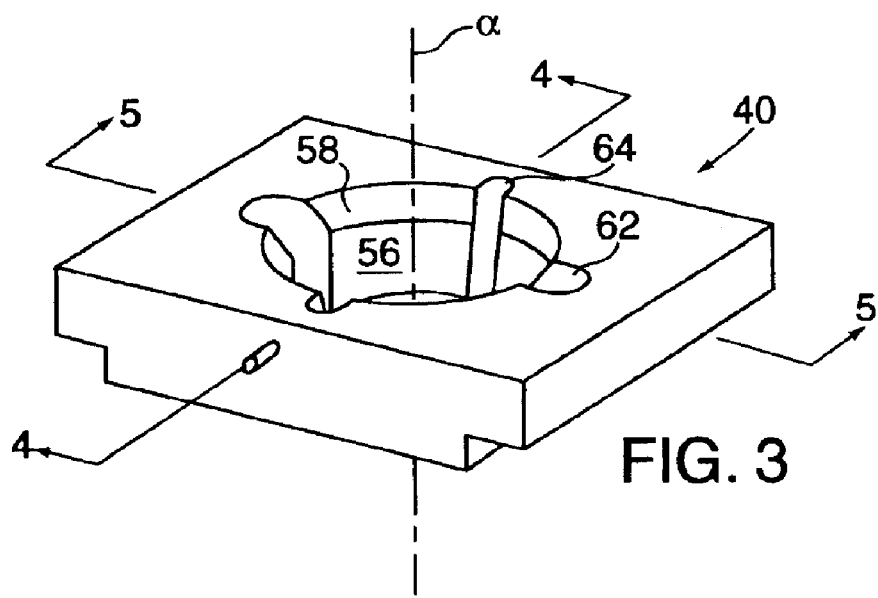
FIG. 3 is a perspective view of the former of the invention.
Figure 4:
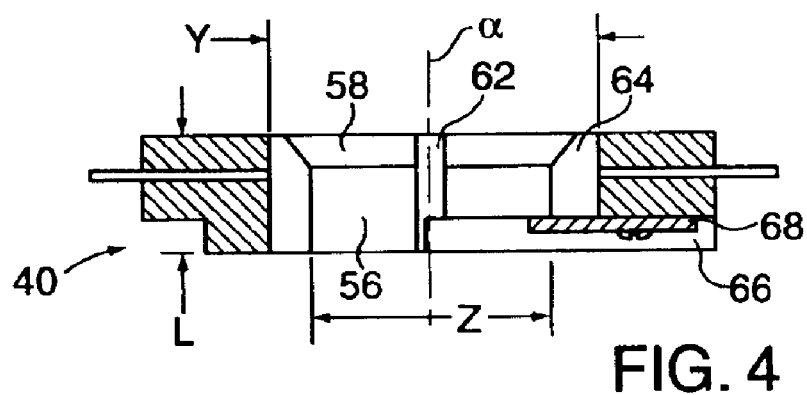
FIG. 4 is a cross-sectional view of the former taken in the direction of line 4—4 of FIG. 3.
Figure 5:
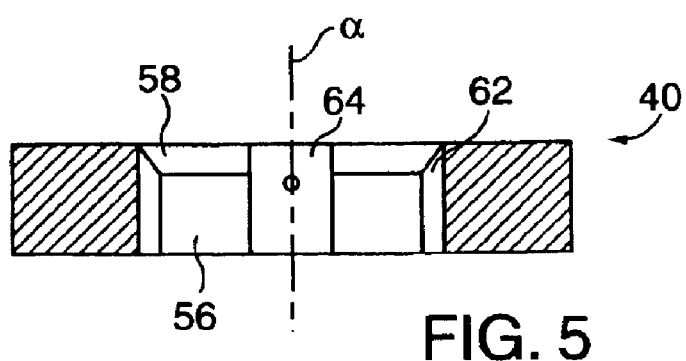
FIG. 5 is a cross-sectional view of the former taken in the direction of line 5—5 of FIG. 3.

Referring now to FIGS. 3, 4 and 5, aspects of former 40 are described in greater detail. As indicated above, FIG. 4 represents a cross section view of former 40 as taken in the direction of line 4—4 of FIG. 3 and FIG. 5 in the direction of line 5—5 thereof. Former 40, in one preferred embodiment, has a hollow conical mouth 58 extending from a larger entry end to a narrow end where it smoothly joins cylindrical portion 56. In other embodiments of the invention, former 40 has no conical entry portion (see FIG. 6). Channels 62 reside in opposed side locations and are oriented substantially parallel to axis α of cylindrical portion 56, and guide grooves 64 are formed substantially parallel to axis α in intermediate positions relative to channels 62. Former 40 is preferably oriented so that guide grooves 64 are aligned with creases C, C' and channels 62 are perpendicular thereto.

Former 40 is configured with an internal diameter Z that substantially conforms to the size of tubular material 14 in its opened condition. As noted in FIG. 4, dimension Y across the widest part of channels 64 is equal to or slightly larger than "layflat" dimension X (see FIG. 2) of tubular material 14. Dimension Z is substantially equal to the diameter of tubular banding material 14 in its fully opened round condition. Dimension L is slightly less than the length to which tubular material 14 is cut to form a sleeve for mounting onto a container 50. Former 40 is preferably made of a material that is dimensionally stable and has a low surface friction, for example ultra high molecular weight polyethylene (UHMWPE).

Figure 6:
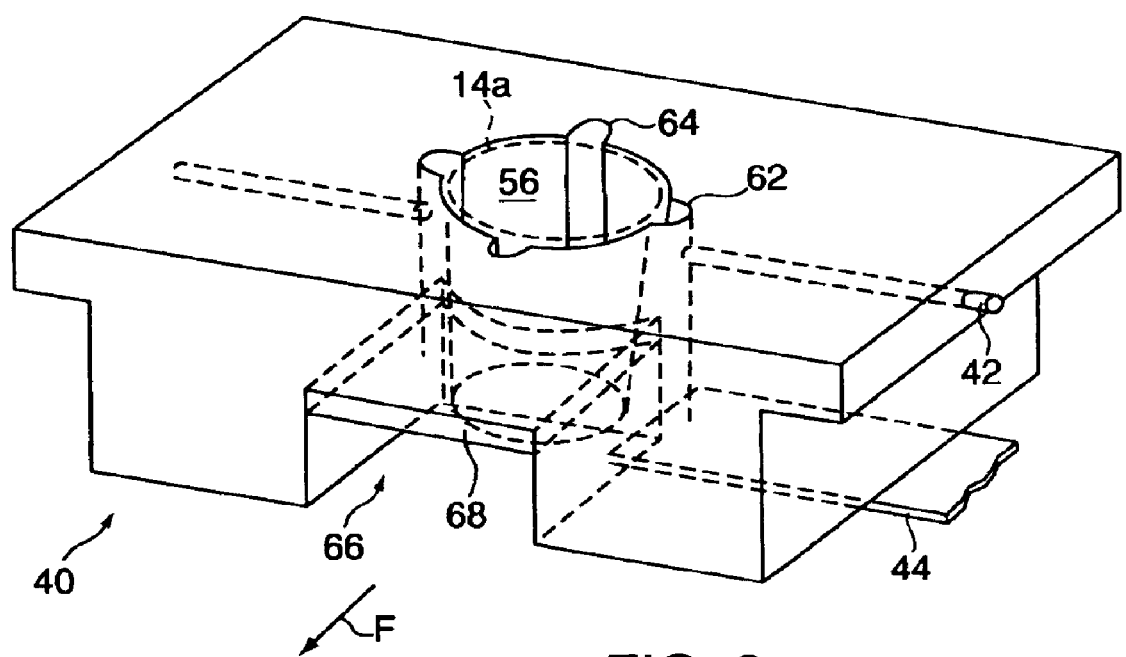
FIG. 6 is a top rear perspective view of the former with details of a gate and a constrictor plate.

Referring now to FIG. 6, and according to the description above, tubular material 14 is advanced in flattened condition through the opening in former 40 to a position above gate 44, thus being positioned adjacent to a constrictor plate 68, shown in FIGS. 4 and 6. Constrictor plate 68 is mounted in an exit chute 66 that is cut into a lower portion of former 40 at an exit side according to the flow direction of conveying containers, indicated by arrow F. Exit chute 66 allows a cut sleeve to move horizontally in the direction F with container 50 while cut sleeve 14a (shown in dashed lines) is dropping down onto a container 50 (see FIG. 1). Constrictor plate 68 is preferably formed at an inner edge thereof with a contour similar to the inner shape of former 40 and is positionable to impinge the central opening of former 40. Therefore, as the air flow from inlets 42 urges cut sleeve 14a to open toward a round configuration, constrictor plate 68 imposes an elliptical restriction to the forward side of cut sleeve 14a. The somewhat elliptical cross section of cut sleeve 14a has been shown to improve the ease and reliability of mounting cut sleeve 14a onto a container 50, improving the operational efficiency.

Cut sleeve 14a rests in position on extended gate 44. When a container 50 is brought close to axial alignment with former 40, actuator 46 (FIG. 2) retracts gate 44, allowing cut sleeve 14a to be discharged onto container 50, whereupon gate 44 is again extended. Various plate designs and methods of moving may be substituted for the planar shape and linear motion of gate 44, as will be apparent to those skilled in the art.

Figure 7A:
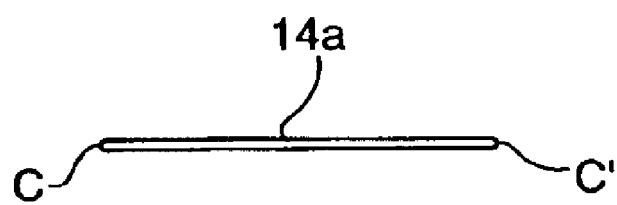
FIGS. 7A–7D illustrate a series of cross sectional top views of a tubular sleeve during the steps of being cut, opened, mounted on a container, and shrunk.
Figure 7B:
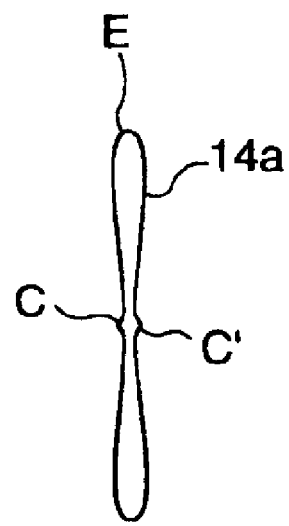
Figure 7C:
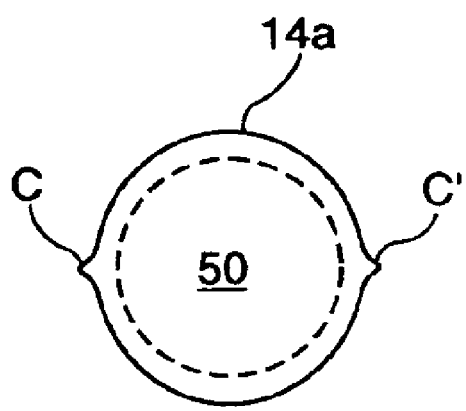
Figure 7D:
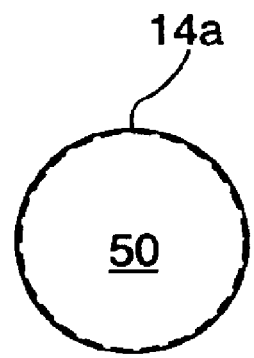

FIGS. 7A–7D show a series of top cross sectional views of cut sleeve 14a in successive steps in the process of the invention. FIG. 7A shows tubular material 14 in flattened condition with creases C and C' at opposed ends thereof. FIG. 7B shows tubular material 14 in cross folded condition with creases C and C' adjacent one another and formed edges E and E' at opposed ends as tubular material 14 is inserted into former 40. FIG. 7C shows cut sleeve 14a in opened condition in former 40 and superimposed over a container 50 in position for mounting sleeve 14a thereupon. FIG. 7D shows sleeve 14a subsequent to mounting and shrinking onto container 50. Whereas cross folded tubular material 14 prior to insertion into former 40 is wider than the diameter of opened sleeve 14a within former 40, as a second length of tubular material 14 is advanced by drive rollers 24, 24' the cut sleeve 14a residing within former 40 is discharged onto a container 50.

The process of the present invention is controlled by a microprocessor (not shown), the steps of which are depicted in reference to the first embodiment in the form of a process chart in FIG. 8, to which reference is now made. The process is initiated in step 102. Upon start-up of the apparatus, air flow is initiated in step 104, and the container conveyor is activated in step 106 to transport containers from a container supply station (not shown) to banding applicator 10. Tubular film 14 is cross folded in step 108 and a length of tubular film advanced in step 110. The cross folded film is inserted into former 40 in step 112. The process awaits a stop signal in step 114 and determines whether a registration mark, i.e. a mark showing the length of a piece of tubular material 14, has been detected in step 116. In step 118, if a registration mark has been detected, the process goes to step 120, stopping the extension of tubular material 14 (FIG. 1); if no registration mark has been detected, the process awaits a signal indicating the dispensed length is equal to the selected set length. Upon receipt of the length signal, the process goes to step 120 and stops the extension of tubular material 14, the cut length being held in the former by the extended gate. Immediately upon stopping the extension of tubular material 14 at step 120, and gate 44 is extended in step 121. Tubular material 14 is cut at step 122. The cut sleeve opens in step 124, and, when an approaching container 50 is detected in step 125, gate 44 is retracted in step 126. A subsequent length of tubular material 14 is advanced into the former to expel the first cut sleeve 14a onto a container 50 passing therebelow in step 128. At this stage, the first sleeve 14a is mounted onto a container 50 and a second length of tubular material 14 is being inserted into former 40. The process is repeated by returning to step 114 to await a stop signal.

In summary, the present invention provides an apparatus for applying a band from a continuous supply of flattened tubular material to each one in a series of containers, the apparatus comprising:
  a. a supply of tubular film material in flattened condition;
  b. a film tube spreader positioned within the tubular film material downstream of the supply;
  c. means positioned downstream of the film tube spreader for advancing a selected length of the tubular material;
  d. a cutter positioned downstream of the advancing means;
  e. a former positioned downstream of the cutter for receiving the flat tubular film and radially opening the tubular film;
  f. the former having a pair of guide grooves positioned to receive a pair of creases on opposed edges of the flat tubular film;
  g. the former further having means to urge the cut flat film to open and form a sleeve;
  h. retention means for holding the cut length sleeve in the former;
  i. means for positioning each one of a series of containers sequentially in axial alignment with the former so as to circumferentially receive an open sleeve from the former.

While the description above discloses a preferred embodiment of the present invention, it is contemplated that numerous variations and modifications of the invention are possible and are considered to be within the scope of the claims to follow.

What is claimed is:

1. A method for applying tubular bands from a supply of flat tubular material to a series of containers, comprising the steps of:
  a. advancing a first length of flat tubular material from the supply;
  b. opening the first length of flat tubular material to a two dimensional cross sectional shape;
  c. extending a gate to a location for preventing the first length of tubular material from passing the gate;
  d. separating the first length of tubular material from the supply of flat tubular material to form a cut sleeve upstream of the gate;
  e. positioning a container in axial alignment with the cut sleeve;
  f. retracting the gate to a location for allowing the cut sleeve to pass; and
  g. advancing a second length of flat tubular material to push the cut sleeve past the gate and onto the container.

2. The method of claim 1, wherein the step of opening the first length of tubular material comprises drawing the tubular material over a spreader having a pair of mutually perpendicular plates and disposed within the tubular material, and inserting the tubular material into a former having an internal shape adapted for opening flat tubular material.

3. The method of claim 1, further comprising controlling the length of flat tubular material advanced from the supply in response to detecting a length indicator.

4. The method of claim 1, further comprising controlling the length of flat tubular material advanced from the supply in response to an encoder signal.

5. The method of claim 1, further comprising the step of sensing the approach of a container prior to the step of retracting the gate.

6. The method of claim 1, wherein the step of opening the cut sleeve comprises directing a fluid flow at an exterior side portion of the cut sleeve within the former.

7. The method of claim 1, further comprising the step of preventing the cut sleeve from fully opening.

8. An apparatus for applying tubular bands from a supply of flat tubular material to each one in a series of containers, comprising:
  a. a supply of tubular material in flat condition;
  b. a spreader for opening the tubular material positioned within the tubular material at a location downstream of the supply,
  c. a cutter positioned downstream of the means for advancing;
  d. a former positioned downstream of the cutter for receiving and opening the tubular material;
  e. a gate mounted adjacent an exit of the former;
  f. means for extending and retracting said gate into and out of the path of a cut length of tubular material;
  g. means for sequentially positioning each one of a series of contained in axial alignment with and downstream of the former; and
  h. means for advancing a subsequent selected length of the tubular material positioned downstream of the spreader to push a cut length of opened tubular material from the former to circumferentially engage a container of the series of containers.

9. The apparatus described in claim 8, further comprising means for extending and retracting the gate adjacent to the exit of the former in response to a signal generated by the approach of a container such that the gate, when in the extended position, retains the cut length in the former.

10. The apparatus described in claim 9, wherein the gate is substantially planar and moveable in a plane substantially perpendicular to an axis of the former.

11. The apparatus described in claim 8, wherein the means for advancing comprises a driven first pair of rollers.

12. The apparatus described in claim 8, wherein the spreader is supported within the tubular material on a second pair of rollers.

13. The apparatus described in claim 8, wherein the former comprises a hollow cylindrical portion that is substantially circular in cross section.

14. The apparatus described in claim 8, wherein the former comprises a hollow cylindrical portion that is substantially square in cross section.

15. The apparatus described in claim 8, further comprising a pair of opposed channels in side portions of the former extending from an entry to an exit of the former.

16. The apparatus described in claim 8, further comprising means for directing a fluid flow at a selected portion of the cut length of flat tubular material to urge the cut length to open radially.

17. The apparatus described in claim 8, further comprising an exit channel in the former configured to allow a cut length of tubular material to move horizontally with a conveyed container as the cut length moves downwardly onto the container.

18. The apparatus described in claim 17, wherein the exit channel is formed substantially perpendicular to an axis of the hollow cylindrical portion of the former in a direction substantially parallel to a path of the container conveyor.

19. The apparatus as described in claim 8, with said former further comprising:
   a. a hollow cylindrical portion extending from an entry to an exit;
   b. a pair of opposed channels formed in side portions of the hollow cylindrical portion from the entry to the exit;
   c. a pair of opposed guide grooves formed in side portions of the hollow cylindrical portion from the entry to the exit and residing between the pair of channels; and
   d. a constrictor plate to selectively reduce the open cylindrical portion and to prevent a cut length of tubular material from fully opening in the former.

20. The former as described in claim 19, further comprising an exit channel in the former configured to allow a cut length of tubular material to move horizontally outwardly with a conveyed container as the cut length moves downwardly onto the container.

21. The former as described in claim 20, wherein the exit channel is formed substantially perpendicular to an axis of the open cylindrical portion of the former in a direction substantially parallel to a path of the conveyed container.

* * * * *

UNITED STATES PATENT AND TRADEMARK OFFICE
CERTIFICATE OF CORRECTION

| | |
|---|---|
| PATENT NO. | : 6,966,164 B2 |
| DATED | : November 22, 2005 |
| INVENTOR(S) | : Jaime Navarro, Kuo-Raid Grant Chen and Adam Whitaker Duncan |

It is certified that error appears in the above-identified patent and that said Letters Patent is hereby corrected as shown below:

Column 8,
Line 36, should read:
-- g. means for sequentially positioning each one of a series of containers in axial alignment with and downstream of the former; and --.

Signed and Sealed this

Thirty-first Day of January, 2006

JON W. DUDAS
*Director of the United States Patent and Trademark Office*